March 2, 1971 G. L. BROOKS 3,567,577
NUCLEAR REACTOR INSTALLATION
Filed April 15, 1968 7 Sheets-Sheet 1

March 2, 1971     G. L. BROOKS     3,567,577
NUCLEAR REACTOR INSTALLATION Filed April 15, 1968     7 Sheets-Sheet 5

United States Patent Office 3,567,577
Patented Mar. 2, 1971

3,567,577
NUCLEAR REACTOR INSTALLATION
Gordon L. Brooks, Clarkson, Toronto, Ontario, Canada, assignor to Atomic Energy of Canada Limited, Ottawa, Ontario, Canada
Filed Apr. 15, 1968, Ser. No. 721,294
Int. Cl. G21c 19/24
U.S. Cl. 176—30                                    13 Claims

ABSTRACT OF THE DISCLOSURE

For loading and unloading fuel aggregates into and from a plurality of vertically extending fuel channels of the reactor, the snout of a fuelling machine head is coaxially aligned with a selected such channel, vertically shifted towards the channel and clamped onto a projecting end thereof. To carry out the necessary motions, a carriage is vertically shiftably mounted on a horizontally movable vehicle and supports a suspension assembly in which the machine head is rotatably mounted about a horizontal axis. The suspension assembly includes four vertically suspended rods connecting the machine head to the carriage, each rod having a universal joint at both ends to permit free horizontal translation of the machine head relative to the carriage, thus compensating for minor misalignments between the snout and the selected channel.

---

Reference is made to copending U.S. applications Ser. Nos. 721,293; 721,295; 721,358; 721,408; 721,409; and 721,410 filed Apr. 15, 1968.

This invention relates to a nuclear reactor installation, comprising a reactor, preferably of the heavy water type, having a plurality of vertically extending fuel channels and a fuelling machine for loading and unloading fuel aggregates into and from said channels.

A typical fuelling machine used in connection with a reactor installation of the above mentioned kind comprises a machine head for receiving one or more fuel aggregates, a snout portion provided on the machine head and adapted to be clamped onto a selected fuel channel, through which snout portion the fuel aggregates are displaced into and from the selected channel. During an unloading/loading procedure, the machine head is horizontally moved to a location vertically underneath the selected channel so as to align the snout with the channel. The machine head is shifted upwardly towards the channel and the snout is clamped onto the projecting channel end. The used fuel aggregate in the reactor channel is then replaced by a fresh one, the snout portion is disengaged from the channel end and the machine head is lowered. The fuelling machine is moved to a storage place where the used fuel aggregate is delivered and a fresh one received.

To be able to connect the rigid fuelling machine to a reactor channel and to transfer the straight fuel aggregates between the machine head and the channel, the snout portion of the fuelling machine head has to be exactly aligned with the selected reactor channel. Due to the complexity and size of the fuelling machine and the distances it has to travel between the storage place and the selected fuel channel, such accurate alignment is difficult to achieve in the horizontal movement of the fuelling machine. This is particularly so because due to the presence of the nuclear fuel it is normally not possible visually to supervise the unloading/reloading procedure. It is obviously desirable to avoid as far as possible the need to work to very fine tolerances in the manufacture and assembly of the fuelling machine, its drive motors, guide rails and all other movable parts.

The present invention provides substantial improvements in this respect. The nuclear reactor installation according to the invention comprises:

A reactor having a plurality of vertically extending fuel channels and a fuelling machine for loading and unloading fuel aggregates into and from said channels, said fuelling machine including (a) a machine head having a snout and means for clamping said snout onto a projecting end of a selected said channel to form a coaxial continuation thereof;
(b) vehicle means for horizontally moving said head generally to align said snout with said selected channel;
(c) carriage means mounted on said vehicle means for vertically shifting said head towards said selected channel; and
(d) suspension means mounting said head for free horizontal translation relative to said carriage means to compensate for minor misalignments between said snout and said selected channel.

In this new concept the required precise alignment between the snout and the channel is achieved with less need to observe especially close tolerances in the manufacture and assembly of the fuelling machine.

In a preferred embodiment of the present invention, the machine head is suspended in the carriage means by at least three (preferably four) vertically suspended rods, each rod having a joint at both ends, each joint permitting free rotation of the rod relative to the carriage or relative to the machine head, respectively, about two horizontal axes substantially perpendicular to each other.

Further features of the present invention will appear from the following specific description which is provided by way of example only.

In the accompanying drawings:

FIG. 5 is a view on the line V—V in FIG. 4 with certain parts omitted;

OVERALL ARRANGEMENT OF FUELLING SYSTEM

Figure 1:
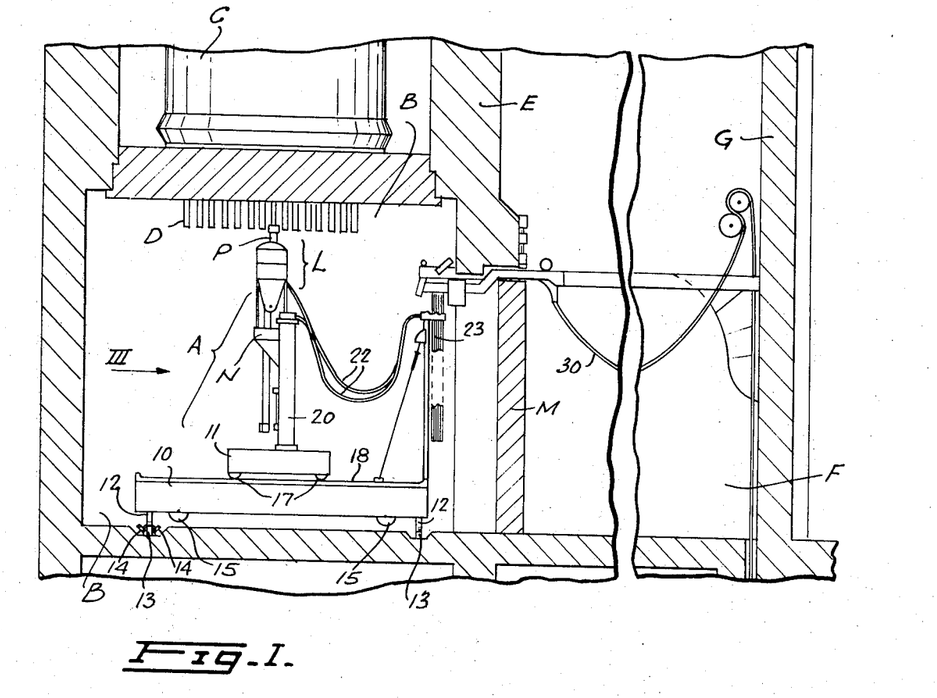
FIG. 1 is a cut-away elevation view of a fuelling machine used in a nuclear reactor installation.
Figure 2:
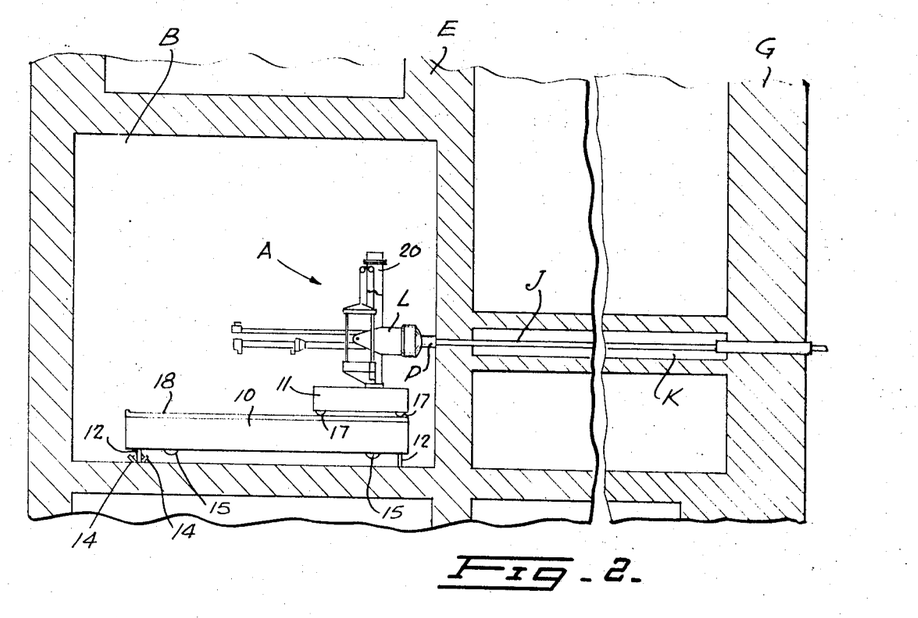
FIG. 2 is a view similar to that of FIG. 1, showing the fuelling machine in a different position.

FIGS. 1 and 2 illustrate the overall arrangement of a fuelling machine A located in a vault B beneath a nuclear reactor vessel C that has a plurality of vertically extending fuel channels D that are required to be kept supplied with strings of nuclear fuel. The building E in which the reactor C is housed is also constructed with a maintenance bay F adjacent the fuelling vault B, in which bay F the fuelling machine A is serviced. A sliding door M is located between the vault B and the bay F. Outside the outer wall G of the reactor building E there is a fuel shuffling bay. Leading from the fuel shuffling bay to the fuelling vault B are three fuel transfer tubes J that extend through a fuel transfer bay K.

FUELLING MACHINE—GENERAL

Still referring to FIGS. 1 and 2, the fuelling machine A will be seen to comprise a main carriage 10 along which a trolley 11 can travel. The carriage 10 is provided with four wheels 12 for travel along the fuelling vault B on rails 13, small subsidiary wheels 14 serving to keep the main wheels 12 engaged with the rails 13. The carriage 10 also has a set of four wheels 15 that are normally raised in the position shown when the machine A is operating in the fueling vault B. When it is desired to move the machine A from the vault B to the maintenance bay F, the wheels 15 are lowered to engage tracks (not shown) extending perpendicularly to the rails 13. To carry out the required movements, all the wheels 12 and 15 are connected to be driven by hydraulic motors (not shown) in a conventional manner.

Movement of the trolley 11 along the main carriage 10 is effected by means of a set of main wheels 17 and subsidiary wheels 19 cooperating with rails 18 (see also FIG. 3), the wheels 17 also being driven by one or more motors (not shown). Mounted to project upwardly from the trolley 11 is a pair of spaced apart columns 20 that serve to support a machine head L in a manner described in detail below. To supply the fuelling machine A with hydraulic and electric power and control signals, cable spans 22, 23 and 30 connect the fuelling machine A with a source disposed outside the maintenance bay F.

GENERAL MANNER OF MOUNTING THE FUELLING MACHINE HEAD

Figure 3:
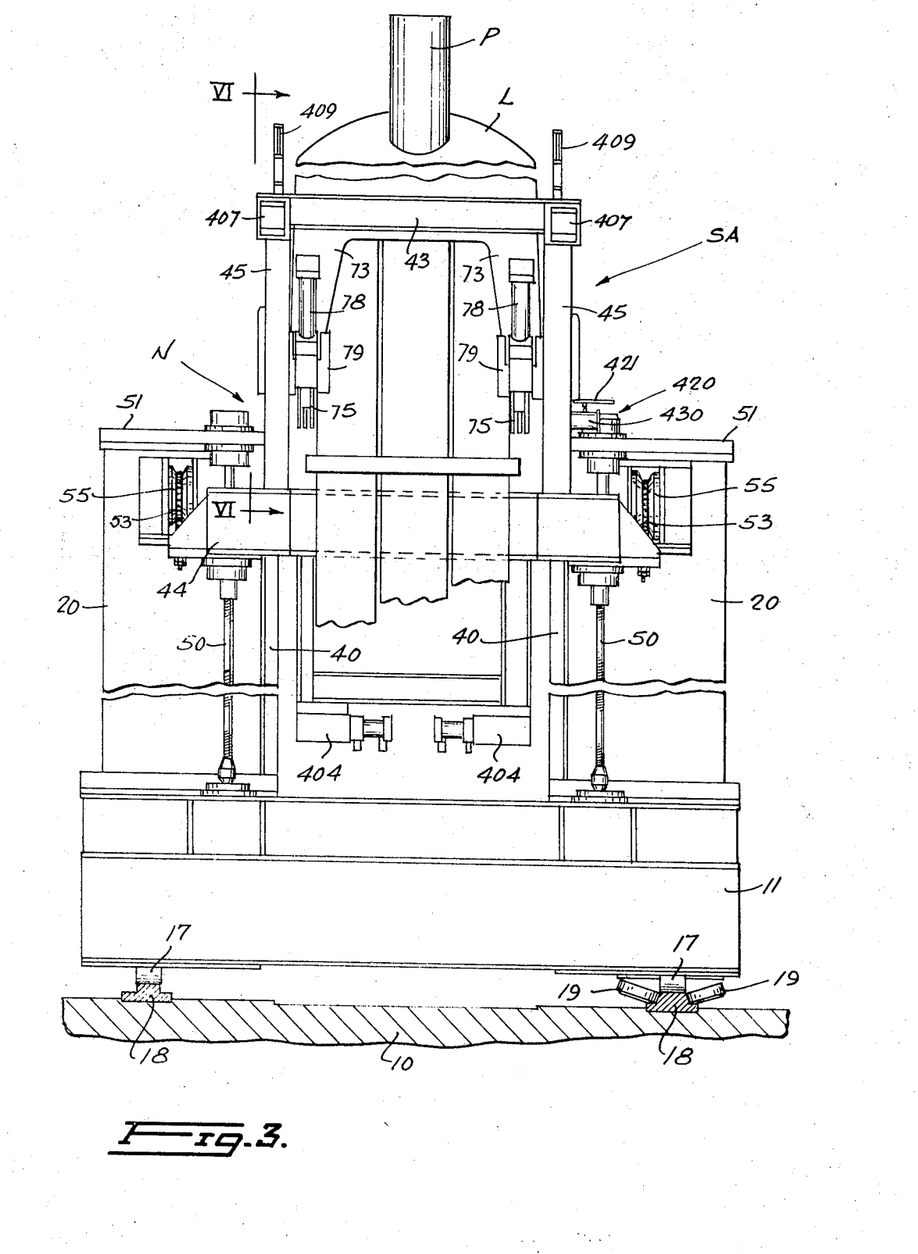
FIG. 3 is a larger scale front view of the fuelling machine seen in the direction of the arrow III in FIG. 1.
Figure 4:
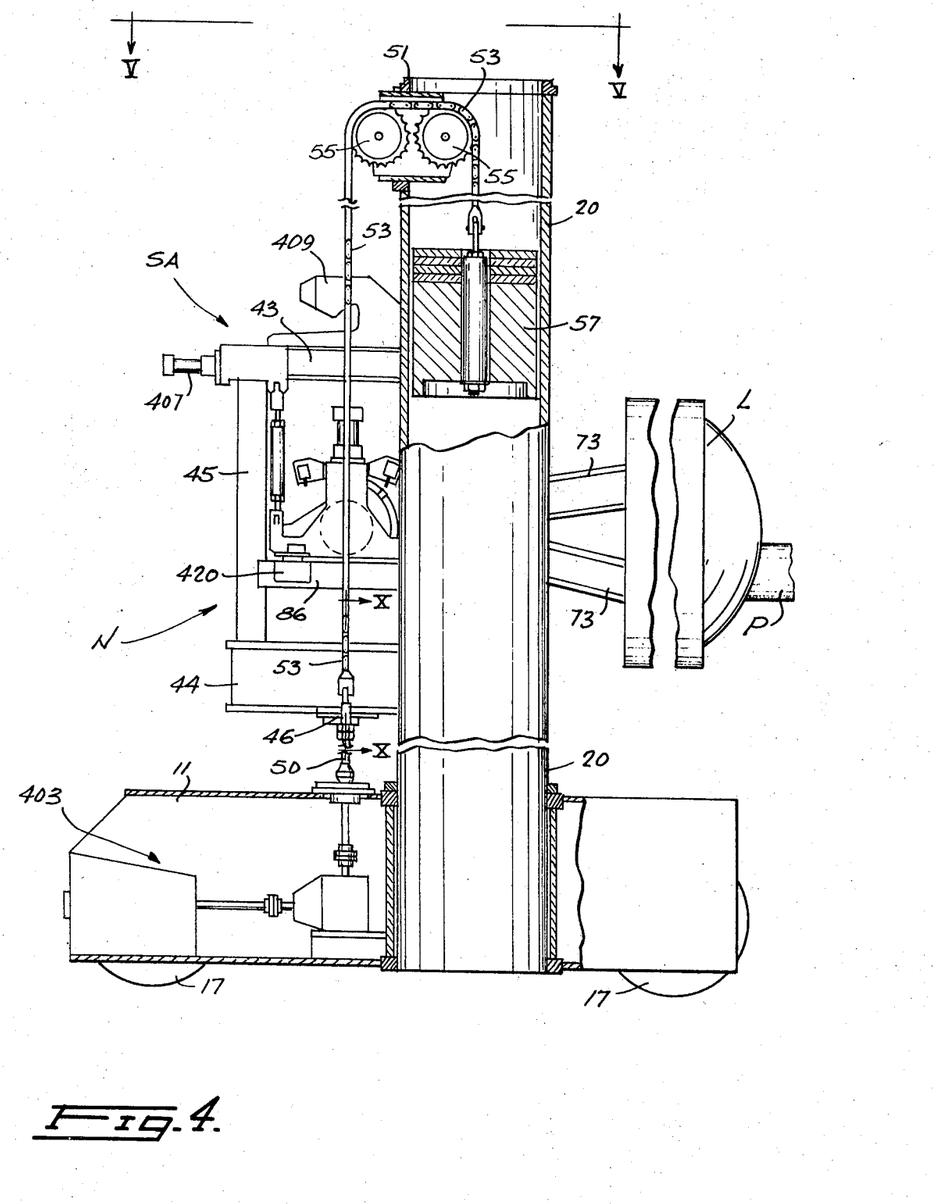
FIG. 4 is a larger scale side view of the fuelling machine in the same position as in FIG. 2.

In order to allow the fuelling machine head L to be displaced in a vertical direction and to be properly aligned with a reactor fuel channel D during the fuelling operation as well as to be moved between a vertical and a horizontal position, the following general suspension concept is employed. As shown in FIGS. 3 and 4, the fuelling machine head L is provided at the end opposite to a snout portion P with two pairs of arms 73 which are pivotably connected to a suspension assembly SA. The suspension assembly SA is mounted on a carriage N which in turn is vertically movable along slideways 40 attached to the columns 20.

CARRIAGE

The carriage N comprises a U-shaped bottom frame 44 with its open side to the left in FIG. 4, four vertical support members 45 mounted at the corners of the bottom frame 44 and two horizontal beams 86 extending parallel to the parallel sides of the U-shaped bottom frame 44 and each beam 86 interconnecting two of the support members 45. On top of each of the support members 45 there is a conical pin 401 (FIG. 6) having a horizontally extending groove 402 in about the middle of its conical surface. As best seen in FIGS. 5 and 10, the bottom frame 44 is provided on each side of the machine head L with an outwardly projecting portion 46.

As shown in FIGS. 3 and 4, a screw-threaded spindle 50 extends parallel to each column 20 with its upper end rotatably mounted in a head member 51 of the column 20 and with its lower end connected to a common drive unit 403 which is disposed within the casting of the trolley 11. As shown in FIG. 10, a nut 47 engaging the respective one of the spindles 50 is mounted in each of the outwardly projecting portions 46. Under normal operating conditions, the two nuts 47 are secured against rotation. Thus, by rotating the two spindles 50 in either direction from the common drive unit 403, the carriage N is raised or lowered.

The projecting portions 46 of the bottom frame 44 include brackets 52 to which the ends of chains 53 are secured by fittings 54. The chains 53 extend over free-running sprockets 55 (FIG. 4) suspended from the head members 51, the other ends of the chains 53 being secured to respective counter weights 57 that are arranged to travel up and down inside the hollow columns 20. In order to hold the carriage N in a certain position when the counterweights 57 are detached for maintenance purposes, there are two locking mechanisms 404 (FIG. 3) provided at a lower extension of the carriage N which mechanism can be operated to engage suitable stops (not shown) provided in the slideways 40.

SUSPENSION ASSEMBLY

Figure 6:
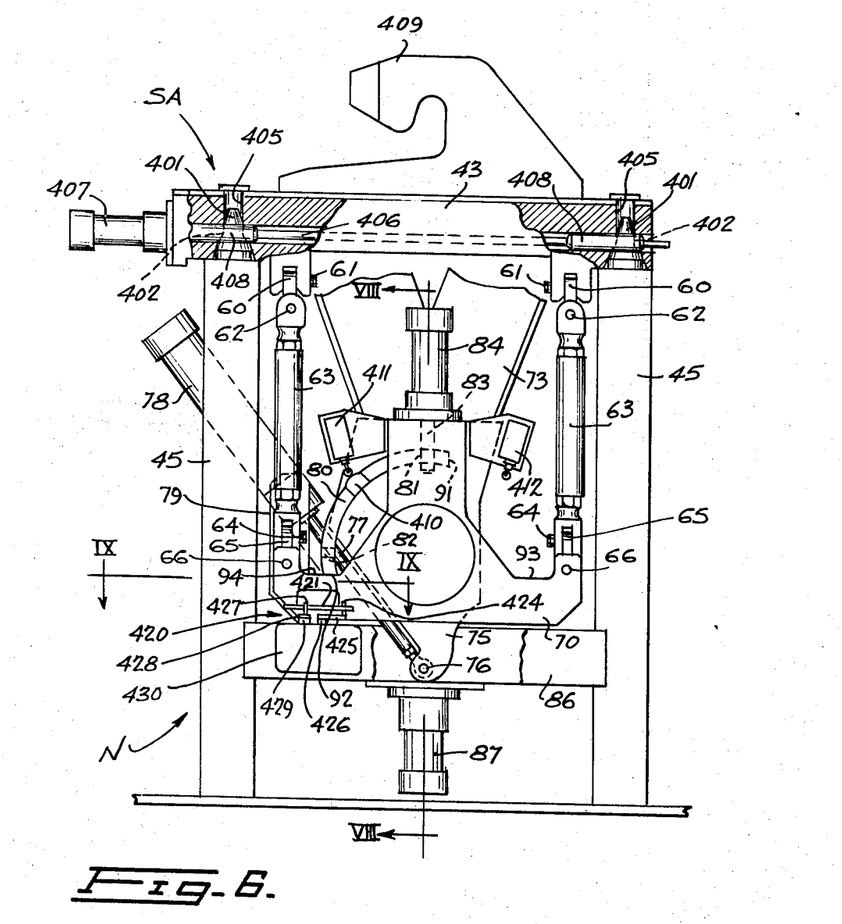
FIG. 6 is a fragmentary side view taken on the line VI—VI in FIG. 3.
Figure 7:
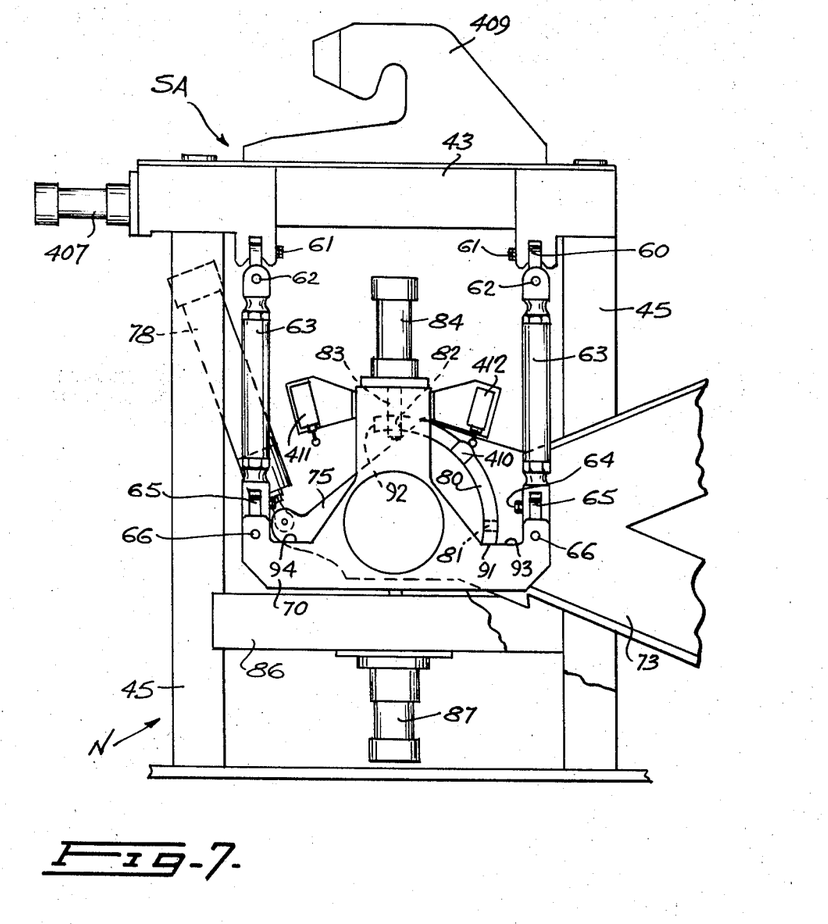
FIG. 7 is a view similar to FIG. 6, but shows the parts in a different position.

As best seen from FIGS. 5 to 7, the suspension assembly SA comprises a U-shaped top yoke 43 with its open side opposite to the side on which the U-shaped bottom frame 44 is open. At the corners of this U-shaped top yoke 43, four suspension lugs 60 are pivoted about parallel horizontal axes defined by respective pins 61. Each lug 60 itself carries a pin 62 which extends horizontally and transversely of the axes of the pins 61, whereby depending suspension links 63 are supported from the top yoke 43 so as to be free to pivot about transverse horizontal axes. At its lower end, each of the suspension links 63 carries a horizontal pin 64 pivotally connecting it to a lug 65, the lugs 65 in turn being pivotally connected by pins 66 that extend in the transverse horizontal direction to respective ends of a pair of spaced-apart inverted T-shaped cross beams 70 arranged one on each side of the carriage N. Thus, the cross beams 70 are free for any horizontal translational movement but are always maintained parallel to the horizontal beams 86.

Four conical bores 405 are provided in the four corners of the top yoke 43 close to the locations where the lugs 60 are attached. In the assembled condition of the carriage N, the bores 405 engage the conical pins 401 on top of the support members 45. In each of the parallel members of the top yoke 43 there is a locking rod 406 shiftably mounted for displacement along its longitudinal axis and connected to a respective hydraulic cylinder 407. Close to both ends each locking rod 406 is provided with portions 408 of enlarged diameter for engagement with the grooves 402 provided in the conical pins 401. In order to separate the suspension assembly SA from the remainder of the carriage N, the locking rods 406 are displaced to the left in FIG. 6 by actuation of the cylinders 407, and the top yoke 43 may then be lifted off by a crane engaging a pair of hooks 409 provided on the upper side of the top yoke 43.

Figure 8:
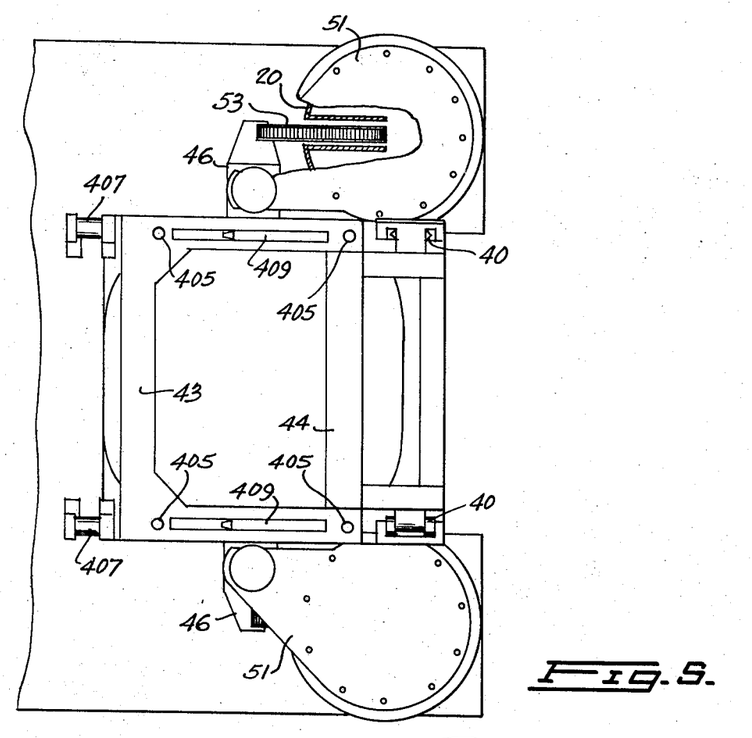
FIG. 8 is a partial section on the line VIII—VIII in FIG. 6.
Figures 8, 10:
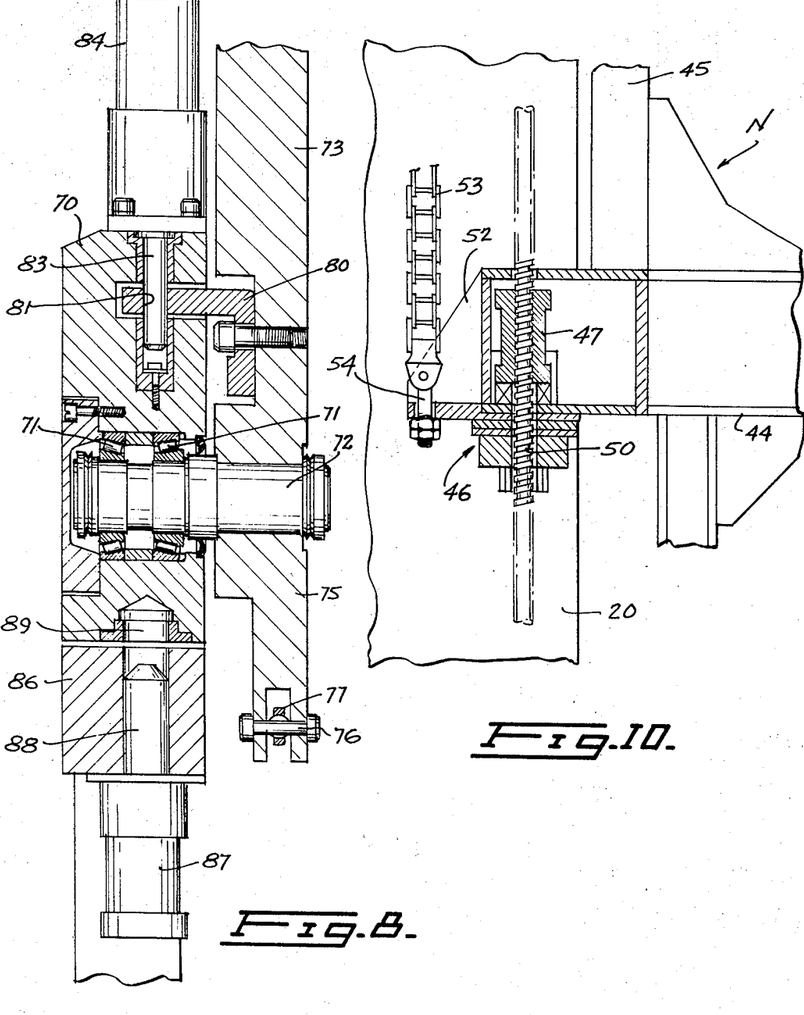
FIG. 10 is a section on the line X—X in FIG. 4.

As best seen in FIG. 8, in the middle portion of the cross beams 70 there are mounted bearings 71 which support shafts 72 on which the arms 73 of the fuelling machine head L are mounted. Each arm 73 is formed with an extension 75 to which the end of a piston 77 of a hydraulic cylinder 78 (FIG. 6) is mounted by a pin 76. The cylinder 78 is pivotally mounted in a bracket 79 which is fixed to the inner side of the cross beam 70. As best seen from FIG. 3, there are two such cylinders 78 which serve to rotate the arms 73 and thus the machine head L from the vertical orientation shown in FIGS. 1, 3 and 6 to the horizontal orientation shown in FIGS. 2, 4 and 7, and vice versa.

Each of the arms 73 carries a circular stop and locking member 80 having two bores 81 and 82 close to its two ends. A locking pin 83 is operable by a hydraulic cylinder 84 mounted on top of the cross beam 70 to engage the bore 81 for locking the respective arm 73 and thus the machine head L in the vertical position, or to engage the bore 82 for locking the arm 73 and the machine head L in the horizontal position. End faces 91 and 92 of the stop and locking member 80 act as stops engaging surfaces 93 or 94 of the cross beam 70 in the respective horizontal or vertical position of the fuelling machine head L. A cam 410 is attached to the middle portion of the stop and locking member 80 to engage a position switch 411 in the vertical position of the machine head L and a position switch 412 in the horizontal position of the machine head L. The two position switches 411, 412 are mounted on the two sides of the middle portion of the cross beams 70.

Mounted on the bottom side of each beam 86 is a hydraulic cylinder 87 that controls a pin 88 (FIG. 8) adapted to enter a hole 89 located in the underside of the adjacent cross beam 70. When extended, the pins 88 will lock the cross beams 70 against horizontal displacement. The cross beams 70 are locked during vertical movement of the carriage N along the columns 20 except when the fuelling machine head L engages a fuel channel D and during horizontal movement of the trolley 11 or the main carriage 10 as well as while the fuelling machine head L engages a fuel transfer tube J. The cross beams 70 are unlocked when the machine head L engages and while it is clamped onto a reactor fuel channel D.

Figure 9:
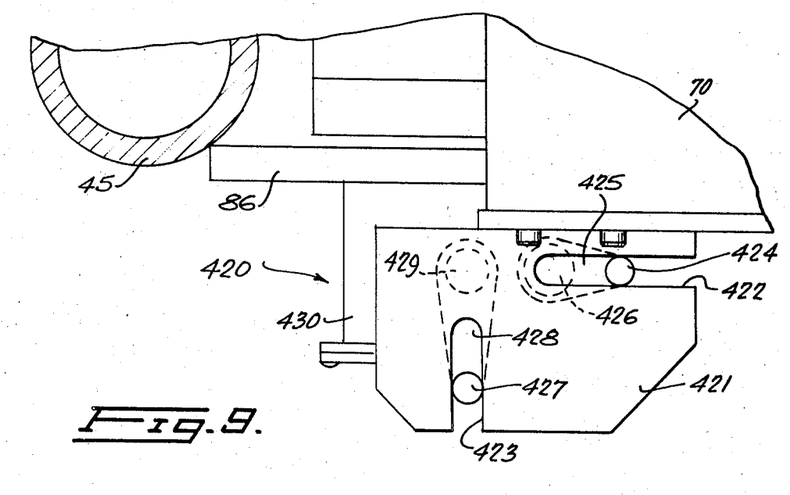
FIG. 9 is a partial section on the line IX—IX in FIG. 6.

In order to sense any horizontal deviations of the suspension assembly SA from a predetermined centre position relative to the carriage N, a sensing device 420 is provided on one side of the carriage N, as shown in FIGS. 3 and 6. Additionally referring to the more detailed view of FIG. 9, the sensing device 420 comprises a horizontally extending plate 421 fixed to a lower portion of the crossbeam 70 of the suspension assembly. The plate 421 is provided with two elongated slots 422 and 423, the slot 422 extending in a direction parallel to the crossbeam 70 and the slot 423 extending in a direction perpendicular thereto. A first vertical pin 424 extends through the slot 422 and is attached to a lever 425 connected to a shaft 426. A second vertical pin 427 extends through the slot 423 and is attached to a lever 428 connected to a shaft 429. The two shafts 426 and 429 are rotatably mounted in a casing 430 fixed to the horizontal beam 86 of the carriage N and are connected to respective potentiometers (not shown) from which electrical signals indicating the horizontal position of the machine head L relative to the carriage N are obtained.

OPERATION

Again referring to FIGS. 1, 2 and 6, for refuelling a selected one of the reactor fuel channels D, the main carriage 10 of the fuelling machine A is horizontally moved along the rails 13 by driving its wheels 12 and subsequently or simultaneously, the trolley 11 is horizontally moved on the rails 18 by driving its wheels 17 until the snout P of the machine head L is generally aligned with the selected channel D. Prior to these movements or also simultaneously, the machine head L has been rotated into its vertical position by actuation of the cylinders 78 and locked in this position by pushing the pin 83 into the bore 81 of the stop and locking member 80. In this position, each cylinder 87 is actuated to withdraw the pins 88 from the holes 89 thereby allowing horizontal movement of the machine head L relative to the carriage N. The carriage N is now lifted by actuation of the drive unit 403 rotating the spindles 53. While the snout P engages the selected fuel channel D a certain amount of misaligment between these parts will be corrected by appropriate conical surfaces at the inter-engaging ends of the snout P and of the channel D, such correction resulting in a horizontal displacement of the crossbeams 70 relative to the carriage N. The displacement is measured by the sensing device 420 and, if it exceeds a predetermined limit, the trolley 11 and/or the main carriage 10 are moved again for better alignment of the snout P with the channel D.

The snout P is now locked onto the end of the reactor channel D, the used fuel aggregate is extracted from the channel, a new aggregrate inserted into it and the snout P unlocked therefrom. The carriage N is then lowered by reverse actuation of the drive unit 403 thereby disengaging the snout portion P from the channel D. The machine head L may now be again locked in its central position by reactuation of each cylinder 87 to reinsert pins 88 into the holes 89.

To deliver the used fuel aggregate now contained in the machine head L and to obtain a fresh one, the main carriage 10 and the trolley 11 are moved to the proper location adjacent a fuel transfer tube J. Simultaneously or as a separate step, the locking pin 83 is retracted from the hole 81, the machine head L is rotated to its horizontal position by actuation of the cylinders 78 until the cam 410 engages the limit switch 412. The locking pin 83 is now pushed through the hole 82 to lock the machine head L in its horizontal position. After exchanging the fuel aggregates between the machine head L and the fuel transfer tube J, the fuelling machine is again ready for refuelling another reactor channel D.

It will be appreciated that there is one fuel aggregate—either used or fresh—housed within the fuelling machine head at any time during which the machine head is rotated between its horizontal and its vertical position, due to the fact that the reactor channels are loaded and unloaded from the same side and by the same fuelling machine and also due to the above described sequence of steps in the reloading operation. Accordingly, the centre of gravity of the machine head will always be at essentially the same location, whenever the head is moved between its two positions, and the axis about which the machine head is rotatably mountd is designed to pass through this centre.

I claim:

1. In a nuclear reactor installation, a reactor having a plurality of vertically extending fuel channels and a fuelling machine for loading and unloading fuel aggregates into and from said channels, said fuelling machine including
    (a) a machine head having a snout and means for clamping said snout onto a projecting end of a selected said channel to form a coaxila continuation thereof;
    (b) vehicle means for horizontally moving said head generally to align said snout with said selected channel;
    (c) carriage means mounted on said vehicle means for vertically shifting said head towards said selected channel; and
    (d) suspension means mounting said head for free horizontal translation relative to said carriage means to compensate for minor misalignments between said snout and said selected channel.

2. An installation as in claim 1, wherein said suspension means includes at least three vertically suspended links, each link having at its upper end a first joint connecting the link to said carriage means for relative rotation about two horizontal axes substantially perpendicular to each other, and each link having at its lower end a second joint connecting the link to said machine head for relative rotation about two horizontal axes substantially perpendicular to each other.

3. An installation as in claim 1, wherein said fuelling machine further includes means for locking said machine head in a position horizontally fixed relatively to said carriage means.

4. An installation as in claim 1, wherein said fuelling machine further includes means for sensing the horizontal position of said machine head relative to said carriage means.

5. An installation as in claim 1, wherein said fuelling machine further includes means for rotating said machine head relatively to said suspension means about a a horizontal axis.

6. An installation as in claim 5, wherein said fuelling machine further includes means for locking said machine head in a position horizontally fixed relatively to said carriage means.

7. An installation as in claim 5, wherein said rotating means includes a two-element cylinder-piston assembly, one said element being pivoted to an extension of said machine head and the other said element being pivoted to said suspension means.

8. An installation as in claim 5, wherein said fuelling machine further includes means for locking said machine head in a rotational position fixed relatively to said suspension means to direct said snout in its vertical position.

9. An installation as in clam 5, wherein said fuelling machine further includes means for sensing rotational positions of said machine head relative to said suspension means.

10. An installation as in claim 1, wherein said fuelling machine further includes two upright columns mounted on said vehicle means and means for vertically shifting said carriage means along said columns.

11. An installation as in claim 10, wherein said shifting means includes a vertically extending screw-threaded spindle rotatably mounted on said vehicle means, a nut fixed to said carriage means and engaging said spindle, and means for rotating said spindle.

12. An installation as in claim 1, wherein said fuelling machine further includes means detachably mounting said suspension means on said carriage means.

13. An installation as in claim 12, wherein said fuelling machine further includes means for locking said suspension means to said carriage means.

References Cited
UNITED STATES PATENTS 3,169,909  2/1965  Hummel ___________ 176—30

CARL D. QUARFORTH, Primary Examiner

H. E. BEHREND, Assistant Examiner

U.S. Cl. X.R.

214—18